United States Patent [19]

Zuo

[11] Patent Number: 5,423,484
[45] Date of Patent: Jun. 13, 1995

[54] INJECTION RATE SHAPING CONTROL PORTED BARREL FOR A FUEL INJECTION SYSTEM

[75] Inventor: Lianghe Zuo, Normal, Ill.

[73] Assignee: Caterpillar Inc., Peoria, Ill.

[21] Appl. No.: 210,517

[22] Filed: Mar. 17, 1994

[51] Int. Cl.$^6$ ............................................. F02M 47/06
[52] U.S. Cl. ........................................ 239/90; 239/91; 239/95
[58] Field of Search ...................... 239/88, 90, 91, 95, 239/89, 96

[56] References Cited

U.S. PATENT DOCUMENTS

| | | |
|---|---|---|
| 2,073,604 | 3/1937 | Beeh . |
| 4,054,248 | 10/1977 | Beardmore ............................ 239/88 |
| 4,448,169 | 5/1984 | Badgley et al. ..................... 239/89 X |
| 4,527,738 | 7/1985 | Martin ................................... 239/90 |
| 4,568,021 | 2/1986 | Deckard et al. ...................... 239/88 |
| 4,653,448 | 3/1987 | Ohmori et al. ...................... 239/88 X |
| 4,811,899 | 3/1989 | Egler .................................... 239/90 X |
| 4,951,631 | 8/1990 | Eckert .................................. 239/88 X |
| 4,976,244 | 12/1990 | Eckert .................................. 239/95 X |
| 4,993,926 | 2/1991 | Cavanagh . |
| 5,029,568 | 7/1991 | Perr ..................................... 239/88 X |
| 5,067,464 | 11/1991 | Rix et al. ............................ 239/89 X |
| 5,121,730 | 6/1992 | Ausman et al. . |
| 5,143,291 | 9/1992 | Grinsteiner ........................... 239/88 |
| 5,213,083 | 5/1993 | Glassey . |
| 5,275,337 | 1/1994 | Kolarik et al. ....................... 239/91 |
| 5,287,838 | 2/1994 | Wells . |

FOREIGN PATENT DOCUMENTS 3009752 9/1981 Germany ............................. 239/95

Primary Examiner—William Grant
Attorney, Agent, or Firm—Joseph W. Keen

[57] ABSTRACT

A fuel injector comprises a casing, a barrel, a piston, a plunger, a nozzle, a needle check and needle check spring, a rate shaping valve and a rate shaping valve spring. The barrel is disposed in the casing and defines a fuel plunger chamber as well as a rate shaping bore between the fuel plunger chamber and an outside of the barrel with a rate shaping valve seat therein. The plunger is disposed in part in the fuel plunger bore of the barrel. The nozzle is disposed in the casing and defines a tip of the fuel injector and also defines a fuel passage from the fuel plunger chamber to an injection orifice at an end of the tip. The needle check is disposed in the nozzle and operably blocks the orifice in a first position. A needle check spring is disposed in the nozzle between the needle check and a reaction member, biasing the check to the first position. The rate shaping valve is disposed in the rate shaping bore of the barrel. The rate shaping valve spring is disposed between the casing and the rate shaping valve.

3 Claims, 4 Drawing Sheets

INJECTION RATE SHAPING CONTROL PORTED BARREL FOR A FUEL INJECTION SYSTEM

TECHNICAL FIELD

The present invention relates generally to fuel injectors for internal combustion engines. More particularly, this invention relates to improvements to fuel injectors to provide fuel injection rate shaping.

BACKGROUND ART

Examples of fuel injection systems are shown in U.S. Pat. No. 4,527,738 issued to Martin on Jul. 9, 1985, U.S. Pat. No. 4,568,021 issued to Deckerd et al. on Feb. 4, 1986, and U.S. Pat. No. 5,213,083 issued to Glassey on May 25, 1993. During a fuel injection cycle or phase, fuel is forced from a fuel plunger chamber in which the pressure of the fuel is increased, through a channel and to a tip portion of a needle check blocking fuel flow through one or more spray orifices. The pressurized fuel forces the needle check to move towards an unseated position, uncovering the orifices and permitting the flow of fuel therethrough.

It is often desired to minimize the quantity of the fuel introduced into the combustion chamber early in an injection cycle to minimize engine combustion noise and/or emissions of nitrogen oxides ($NO_x$). Such a reduction in the quantity of fuel delivered during an early portion of an injection cycle is hereinafter referred to as rate shaping of the fuel delivery. There are several known devices available which permit rate shaping of fuel delivery charges. It is desired to provide a compact and simplified rate shaping device that can be packaged within a fuel injector.

The present invention is directed to overcoming one or more of the problems as set forth above.

DISCLOSURE OF THE INVENTION

In one aspect of the present invention, a fuel injector is disclosed which comprises a casing, a barrel, a plunger, a nozzle, a needle check and needle check spring, and a rate shaping valve and a rate shaping valve spring. The barrel is disposed in the casing and defines a fuel plunger bore as well as a rate shaping bore between the fuel plunger chamber and an outside of the barrel with a rate shaping valve seat therein. The plunger is disposed in part in the fuel plunger bore of the barrel, defining a fuel plunger chamber. The nozzle is disposed in the casing and defines a tip of the fuel injector and also defines a fuel passage from the fuel plunger chamber to at least one injection orifice at the tip. The needle check is disposed in the nozzle and operably blocks the orifice in a first position. A needle check spring is disposed in the nozzle between the needle check and a reaction member of the nozzle, biasing the check to the first position. The rate shaping valve is disposed in the rate shaping bore of the barrel. The rate shaping valve spring is disposed between the casing and the rate shaping valve.

THE BEST MODE FOR CARRYING OUT THE INVENTION

Figure 1:
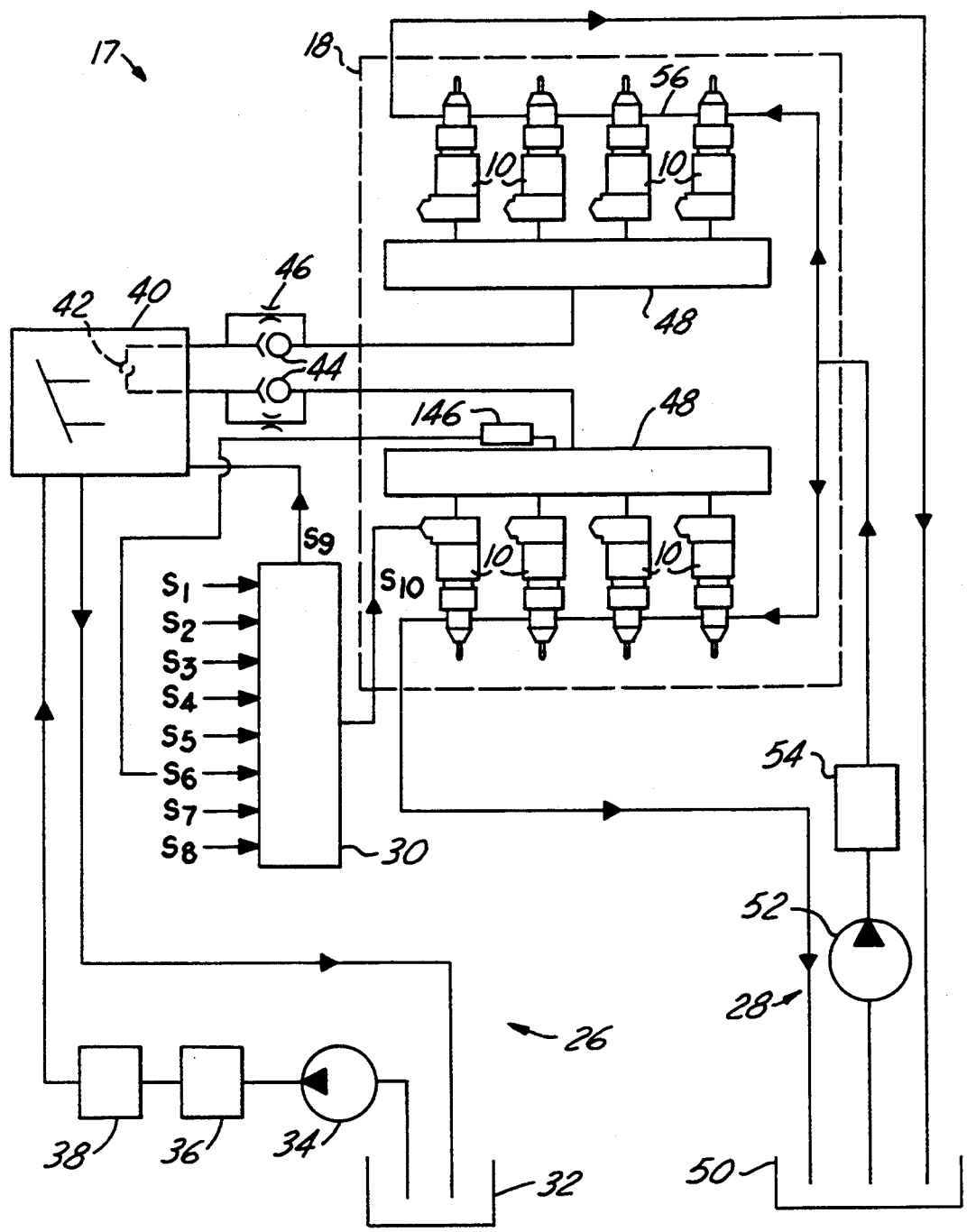
FIG. 1 is a schematic representation of a hydraulically-actuated electronically-controlled unit injector fuel system of the present invention, including both an actuating fluid circuit and a fuel injection circuit for an eight cylinder internal combustion engine having eight unit injectors.

Referring to FIGS. 1 through 5 wherein the same references numerals designate the same elements or features throughout all of FIGS. 1 through 5, a unit fuel injector 10 has a barrel 12 defining a fuel plunger or pressurization bore 14 and a rate shaping bore 15 with a rate shaping valve 16 disposed therein. The unit injector 10 is, for example, disposed in a hydraulically-actuated electronically-controlled injector system 17, hereinafter referred to as a HEUI fuel injector system. Alternatively, the rate shaping invention is also applicable to other types of fuel injectors, including, but not limited to, mechanically-actuated electronically-controlled unit injectors, mechanically-actuated mechanically-controlled unit injectors, and injection pumps used in pump-line-nozzle fuel injection systems.

The unit injectors 10 are shown in FIG. 1 as being employed with a diesel-cycle direct-injection internal combustion engine 18. While a V-eight type engine is illustrated in FIG. 1 and described herein, it should be understood that the invention is also applicable to other types of engines, such as in-line cylinder engines and rotary engines, and that the engine may contain fewer or more than eight cylinders or combustion chambers 19.

Figure 2:
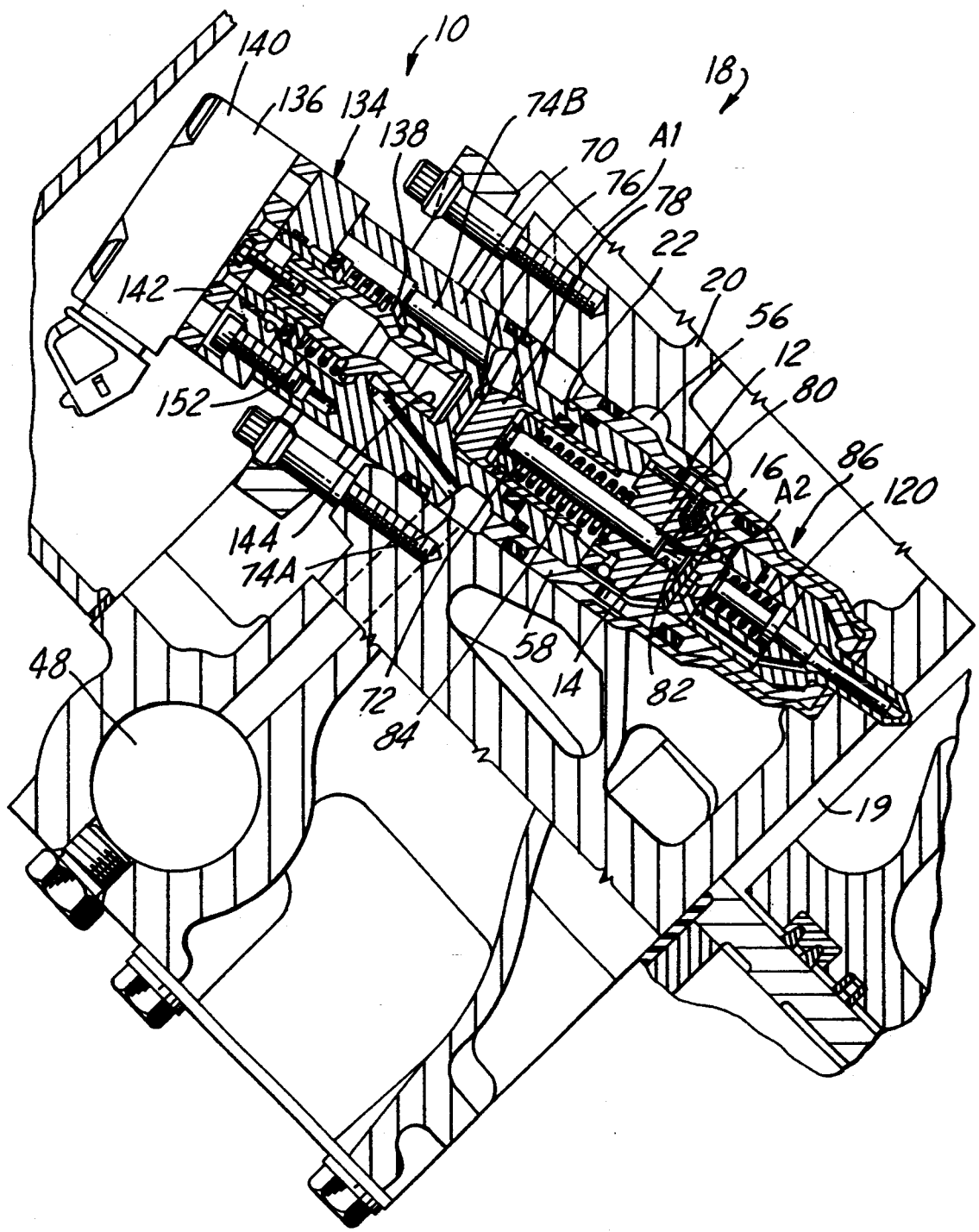
FIG. 2 is a diagrammatic partial cross-sectional view of one embodiment of a unit injector of FIG. 1 as installed in an exemplary internal combustion engine.

The exemplary engine 18, only partially shown in FIG. 2, has a pair of cylinder heads 20. Each cylinder head 20 has one or more unit injector bores 22 with four being provided here. The following description will first describe the elements and operation of the HEUI system 17 and then will describe in more detail specifics of the inventive embodiments of the rate shaping valve 16.

Referring to FIGS. 1 and 2, the HEUI fuel injection system 17 preferably includes one or more hydraulically-actuated electronically-controlled unit injectors 10 adapted to be positioned in a respective unit injector bore 22, means or device 26 for supplying hydraulic actuating fluid and damping fluid to each unit injector 10, means or device 28 for supplying fuel to each unit injector, and means or device 30 for electronically controlling the HEUI fuel system 17 such as an electronic control module (ECM) 30. While unit injectors 10 are preferred in this embodiment, other applications might be better served by non-unitized injectors.

The means or device 26 for supplying hydraulic actuating fluid and damping fluid to each unit injector 10 includes a sump 32 and a low pressure transfer pump 34 which draws fluid from the sump 32. The device 26 also includes a cooler 36, a filter 38 and a high pressure pump 40 with an integrated pressure control system, through which hydraulic actuating fluid from the low pressure transfer pump 34 is passed. The high pressure pump 40 varies an output pressure of fluid from an output port 42 of the high pressure pump 40 in response to a signal S9 from the ECM 30. The signal S9 from the ECM 30 is determined as a function of one or more input signals S1 through S8 indicative of a plurality of system parameters.

Hydraulic actuating fluid passes from the output port 42 of the pump 40 to check valves 44. The check valves 44 are in parallel with orifices 46. Hydraulic actuating fluid passes from the check valves 44 to hydraulic actuating fluid manifolds 48. Hydraulic actuating fluid within the manifold 48 enters the fuel injector units 10.

The means or device 28 for supplying fuel includes a fuel tank 50 and a transfer pump 52 removing fluid therefrom and passing it through a conditioning means 54, also part of the fuel supplying device 28. Fuel passes from the conditioning means 54 into fuel manifolds 56 and to the respective banks of unit injectors 10. Fuel is supplied to the fuel manifolds 56 and injectors 10 at a relatively low pressure (for example, about 276 to 413 kPa or 40 to 60 psi).

The injector 10 has a casing 58 having a central axis 60 and defining a cavity 62 therealong for supporting and retaining subcomponents of the injector 10. The barrel 12 is disposed in the casing 58. The barrel 12 has a substantially cylindrical shape. The fuel plunger bore 14 is parallel to the axis 60. The rate shaping bore 15 defines a rate shaping opening 64 or port at the fuel plunger bore 14. The rate shaping bore 15 also defines a rate shaping valve seat 66 disposed between the opening 64 and an outside 68 of the barrel 12.

A body 70 is disposed in part in the casing 58 and extends therefrom opposite the barrel 12. The body 70 defines a piston bore 72 therein open toward the barrel 12. The body 70 also defines communication channels 74A and 74B fluidly connecting the hydraulic actuating fluid manifold 48 with a piston pressure chamber 76.

A reciprocal intensifier piston 78 is slidably disposed in the piston bore 72, thereby defining the piston pressure chamber 76. A reciprocal fuel pressurization plunger 80 extends from the piston 78 and is slidably disposed in the fuel plunger bore 14 of the barrel 12, thereby defining a fuel plunger or pressurization chamber 82 therein. The plunger 80 may be either a separate component or integral with the piston 78. A plunger spring 84 is disposed between the intensifier piston 78 and the barrel 12, circumscribing the plunger 80.

A nozzle assembly 86 is disposed in part in the casing 58 against the barrel 12 and opposite the body 70. The nozzle assembly 86 includes a tip 88, a sleeve 90, a stop 92, and an intermediate plate 94. The nozzle assembly 86 defines a fuel discharge passage 96 from the fuel plunger chamber 82 to at least one and preferably a plurality of injection orifices 98 defined through an end portion 100 of the tip 88.

The intermediate plate 94 is disposed against an end of the barrel 12 opposite the body 70.

The stop 92 abuts the intermediate plate 94 opposite the barrel 12. The intermediate plate 94 and stop 92 define a fuel inlet passage 102 and part of the discharge passage 96. The discharge passage 96 has a check valve passage of fuel to the fuel plunger chamber 82. The fuel inlet passage 102 has a check valve 106 preventing fuel in the fuel plunger chamber 82 from returning to a low pressure annular passage 108 between the nozzle assembly 86 and the casing 58.

The sleeve 90 abuts the stop 92 on a side opposite the barrel 12. The sleeve 90 defines a spring chamber 110 parallel to the axis 60, a continuation of the discharge passage 96 within a wall of the sleeve 90 and approximately parallel to the axis 60, and an exhaust port 112 passing through the sleeve 90 normal to the axis 60.

The tip 88 abuts the sleeve 90 opposite the stop 92. The tip 88 has an elongated reduced diameter stem portion 114 centered on the axis 60. The end 100 of the tip 88 defines the end of the stem 114. The tip 88 defines both an extended blind bore 116 along the axis 60 toward the end 100 of the stem portion 114, and a further continuation of the discharge passage 96. The spring chamber 110 of the sleeve 90 and the bore 116 of the tip 88 together comprise a continuous cavity, with a first end at the end 100 of the tip 88 and a second end at the stop 92. A needle check 118 and a needle check spring 120 are disposed in the continuous cavity 110 and 116.

In the present embodiment, the check 118 has a spring seat portion 122 and a pin portion 124. The spring seat portion 122 is disposed in the spring chamber 110 with the pin portion 124 extending yet further into the spring chamber 110. The spring 120 is disposed between the spring seat portion 122 and the stop 92. A guide portion 126 of the check 118 is slidably disposed in the blind bore 116, forming a radial seal therewith. A reduced diameter end portion 128 defines an annular discharge passage 130 between itself and the tip 88. The reduced diameter end portion 128 has a point 132 with a tapered shape for seating within the end 100 of the needle check tip 88 and large enough to cover and block the orifices 98 of the end 100. The spring 120 biases the check 118 to a closed position in which it stops, or blocks, the orifices 98.

A junction between the discharge passage 96 and the annular discharge passage 130 is characterized by a cardioid chamber approximately aligned with a transition in the check 118 from the guide portion 126 to the reduced diameter end portion 128.

An actuator and valve assembly 134 of each unit injector 10 as shown in FIG. 2 is provided as a means or device for selectively communicating either high pressure actuating fluid or low pressure damping fluid to each unit injector 10 in response to receiving an electronic fuel delivery command signal S10. The actuator and valve assembly 134 includes an actuator 136, preferably in the form of a solenoid assembly 136, and a valve 138, preferably in the form of a poppet valve 138. The solenoid assembly 136 includes a stator assembly 140 fixed to the body 70 and a movable armature 142. The popper valve is slidably disposed in a popper valve bore 144 and is fixed to the movable armature 142.

The rate shaping valve 16 is pressed against the rate shaping valve seat 66 by a rate shaping valve spring 145 disposed between the valve and the casing 58.

The ECM 30 receives input data signals from one or more signal indicating devices, for example, eight signal indicating devices providing signals S1 through S8. Input data signals may include engine speed S1, engine crankshaft position S2, engine coolant temperature S3, engine exhaust back pressure S4, air intake manifold pressure S5, hydraulic actuating fluid manifold pressure S6, throttle position or a desired fuel setting S7, and transmission operating condition indicative signal S8, which, for example, may indicate the gear setting of the transmission. The output control signal S9 is the actuating fluid manifold pressure command signal directed to the high pressure pump which is an element of the device 26 for supplying hydraulic actuating fluid. A pressure transducer 146 for providing signal S6 is shown in FIG. 1.

Figure 3:
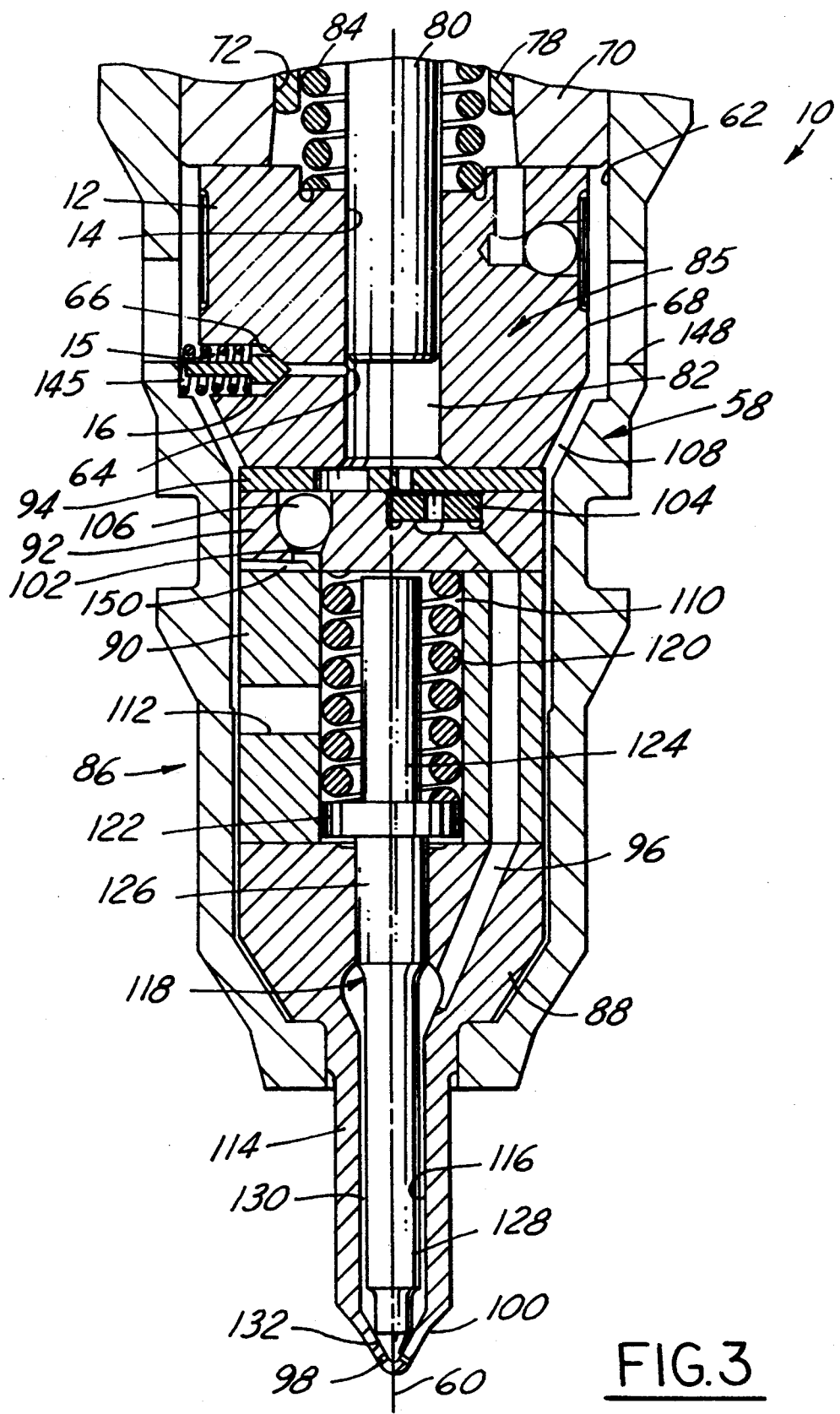
FIG. 3 is an enlarged view of a nozzle area of the fuel injector shown in FIG. 2.

The HEUI system operates in the following manner. Referring to FIGS. 2 and 3, the low pressure fuel from the fuel manifold 48 flows through case fuel inlet holes 148, the low pressure annular passage 108 between the casing 58 and the barrel 12 and the nozzle assembly 86, a close-clearance passage 150 such as an edge filter, and then the fuel inlet passage 102. The relatively low pressure fuel unseats the check valve 106 disposed in the inlet passage 102 when the pressure in the fuel plunger chamber 82 is lower than the pressure upstream of the check valve 106 by a selected amount. While the check valve 106 is unseated, the fuel plunger chamber 82 is refilled with fuel.

While the solenoid assembly 134 is in its de-energized state, the poppet valve 138 is biased to a first blocking position by a poppet spring 152, blocking fluid communication between the communication channels 74A and 74B, thereby preventing high pressure actuating fluid from reaching the piston pressure chamber 76. With negligible fluid pressure in the piston pressure chamber 76, the plunger spring 84 pushes upwardly against the plunger 80 and intensifier piston 78, seating the piston against an end of the piston pressure chamber 76.

The HEUI system allows an injection start point, an injection stop point, and the injection pressure to all be regulated independent of engine speed and load. The quantity of fuel delivered can consequently be varied independent of engine speed and load.

In order to start injection independent of engine speed and load, a fuel delivery command signal S10 is emitted by the ECM 30 and delivered to an electronic drive unit (not shown). The electronic drive unit generates a preselected wave form which is conducted to the solenoid assembly 136 of a selected unit injector 10. The solenoid assembly 136 is electrically energized so that the armature 142 is magnetically drawn toward the stator 140. The poppet valve 138 is moved by the armature 142 to an inject position where the communication channels 74A and 74B are fluidly connected, directing hydraulic actuating fluid at a relatively high pressure (for example, about 23 MPa or 3335 psi) into the piston pressure chamber 76, thereby hydraulically exerting a driving force on the intensifier piston 78.

The high pressure actuating fluid displaces the intensifier piston 78 and plunger 80 in opposition to the force generated by the compressed plunger spring 84 and fuel pressure. The fuel in the fuel pressurization chamber 82 is pressurized to a level which is a function of the pressure of the actuating fluid in the intensifier piston pressure chamber 76 and the ratio of effective areas A1/A2 between the intensifier piston 78 and the plunger 80. This pressurized fuel flows from the fuel plunger chamber 82 and through the discharge passage 96 to the annular discharge passage 130 where it acts on the needle check 118 in opposition to a force exerted by the needle check spring 120. The pressurized fuel lifts the needle check 118 after a selected pressure level is reached and the highly pressurized fuel passes through the spray orifice 98 for the start of injection into the combustion chamber 19.

In order to end injection, or control the quantity of fuel injected independent of engine speed and load, the ECM 30 discontinues its fuel delivery command signal S10 to the electronic drive unit. The electronic drive unit then discontinues its wave form, thereby electrically de-energizing the solenoid assembly 136 of the selected unit injector 10. The absence of the magnetic force allows the compressed popper spring 152 to expand causing both the armature 142 and the popper valve 138 to move back to their blocking positions.

INDUSTRIAL APPLICABILITY

Fuel in the fuel plunger chamber 82, the discharge passage 96, and the annular discharge passage 130 is at essentially the same pressure. At low pressure, the rate shaping valve spring 145 keeps the rate shaping valve 16 seated, and the check spring 120 keeps the check 118 seated. When the intensifier piston 78 is exposed to high pressure actuating fluid, the plunger 80 is forced downward into the barrel bore 14, dramatically increasing the pressure of the fuel within the nozzle 86.

Fluid pressure against the check 118 displaces it upward against the force of the check spring 120. Fuel flows from the fuel plunger chamber 82 through the discharge passage 96 and into the annular discharge passage 130 where a portion of the fuel is sprayed through the orifices 98 and into the combustion chamber 19.

Once injection begins or sometime thereafter, the pressure increases to a selected level sufficient to unseat the rate shaping valve 16, thereby beginning rate shaping. Pressurized fuel overcomes the spring load, escaping to the annular passage 108 of the fuel system. As the plunger 80 moves past an end of the rate shaping opening 64, however, the pressurized fuel can no longer reach and escape past the rate shaping valve 16, thereby ending the rate shaping. The balance of the fuel discharge from the fuel pump chamber 82 is exclusively through the spray orifices 98.

Figure 4:
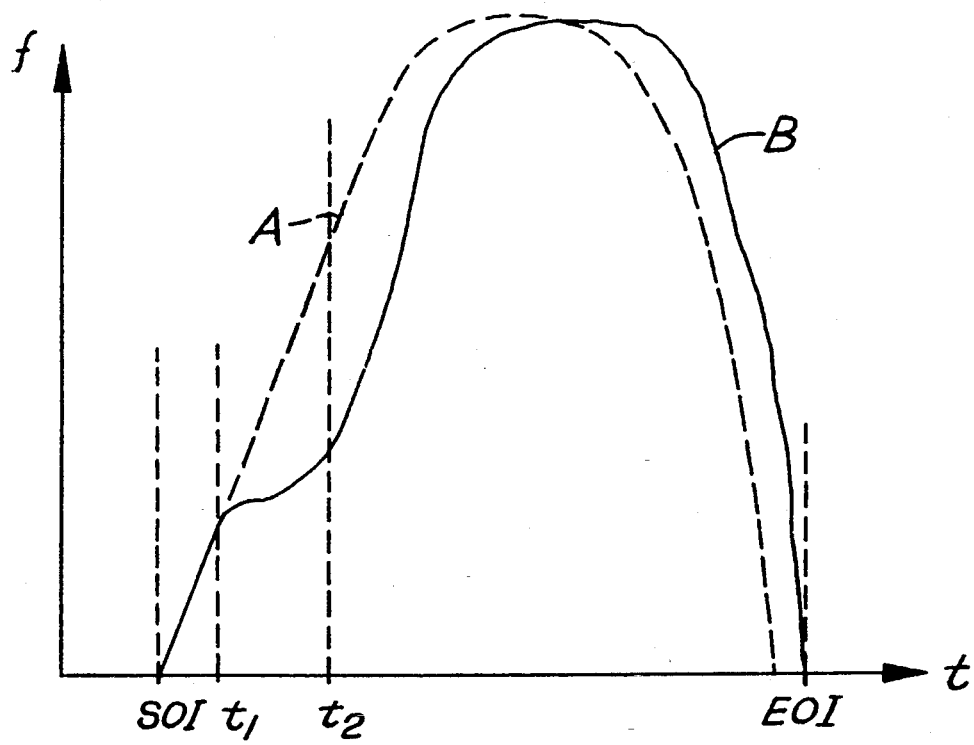
FIG. 4 is plot of fuel discharge as a function of time.

The flow of fuel past the rate shaping valve 16 gives the present invention its rate shaping characteristic. FIG. 4 shows plots of fuel discharge f into a combustion chamber as a function of time t. The plots schematically illustrate fuel discharge both with and without the benefit of rate shaping according to the present invention. Line A of FIG. 4, shown as a hashed line, shows the fuel discharge without the benefit of a rate shaping valve 16. Line B, which is shown as a solid line, represents the discharge into a combustion chamber 19 which would be expected with an injector 10 having a rate shaping valve 16 as described in the present invention. It is readily evident that the fuel injection rate shaping decreases the amount of fuel injected into the combustion chamber 19 early in the injection cycle. SOI is the point in time where the check unseats and injection starts. Time $t_1$ is the point in time where the valve 16 unseats and rate shaping begins. Time $t_2$ is where the opening, or port 64 is covered by the plunger 80. After the port 64 is covered by the plunger 80, the fuel pressure in rate shaping bore 15 decreases to a level such that the spring 145 returns the valve 16 to its seat 66. EOI is the end of the injection cycle where the check returns to a seated or closed position. A seating diameter of valve 16 and a preload of the valve spring 145 determine the pressure at which injection rate shaping begins. The axial location of the rate shaping opening 64 relative to the initial (retracted) position of the plunger 80 primarily determines the pressure at which fuel injection rate shaping ends. The degree or severity of rate shaping is determined by the restriction provided by the opening 64 and the geometry of the valve seat 66. The starting, ending, duration, and degree of rate shaping can be controlled by varying the appropriate above parameters to achieve a desired rate shaping for particular applications.

Figure 5:
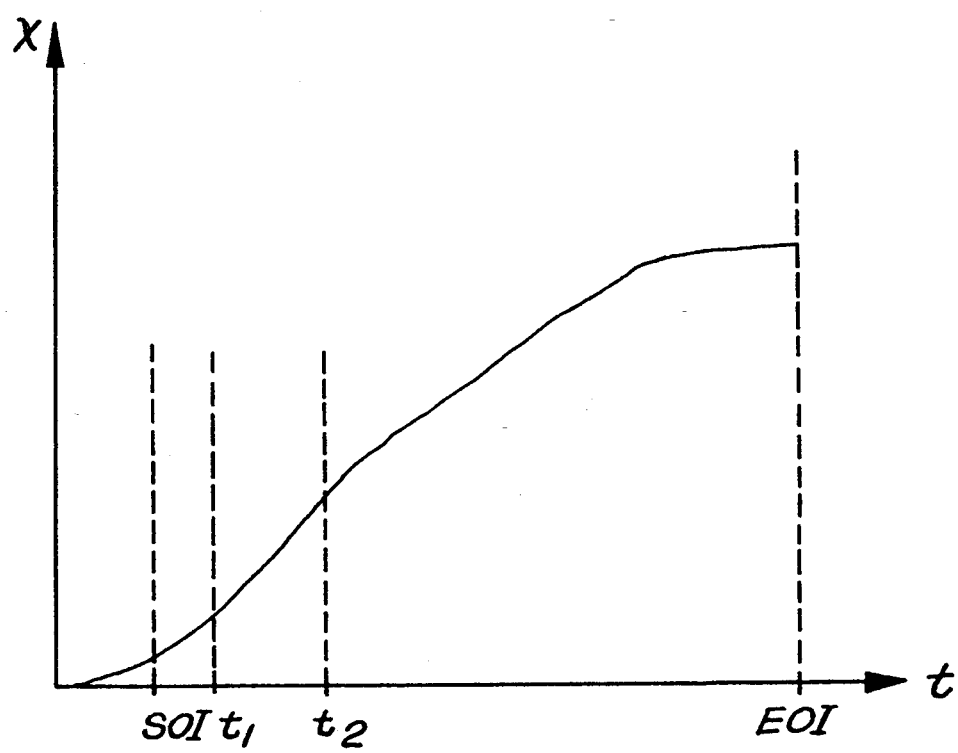
FIG. 5 is a plot of displacement of the plunger as a function of time.

FIG. 5 is a plot showing displacement x of the plunger 80 as a function of time t during an injection cycle.

Other aspects, objects, and advantages of this invention can be obtained from a study of the drawings, the disclosure, and the appended claims.

I claim:

1. A fuel injector comprising:

a casing;

a barrel disposed in the casing and defining a fuel plunger bore on a first axis and defining a rate shaping bore between the fuel plunger bore and an outside of the barrel in turn defining a rate shaping opening at the fuel plunger bore and defining a rate shaping valve seat within the rate shaping bore disposed between the opening and the outside of the barrel;

a plunger slidably disposed in part in the fuel plunger bore and defining a fuel plunger chamber, the fuel plunger chamber being open to the rate shaping opening with the plunger in a start of injection position and closed to the rate shaping opening with the plunger in an end of injection position;

a nozzle disposed in the casing and defining a tip of the fuel injector and defining a fuel passage from the fuel plunger chamber to at least one injection orifice at an end portion of the tip;

a needle fuel check disposed in the nozzle and operably blocking fuel flow through the orifice while said needle check is at a first position;

a needle check spring disposed in the nozzle between the needle check and a reaction member biasing the check to the first position;

a rate shaping valve disposed in the rate shaping bore of the barrel; and a rate shaping valve spring disposed between the casing and the rate shaping valve.

2. A fuel injector comprising:

a casing;

a barrel disposed in the casing and defining a fuel plunger bore and defining a rate shaping bore fluidly connecting the fuel plunger bore with an outside of the barrel in turn defining a rate shaping opening at the fuel plunger bore and defining a rate shaping valve seat within the rate shaping bore disposed between the opening and the outside of the barrel;

a body disposed in part in the casing and extending therefrom opposite the barrel and defining a piston pressure chamber at an end of a piston bore and a communication channel between a source of pressurized actuating fluid and the piston pressure chamber;

a piston slidably disposed in the piston bore;

a plunger connected to the piston and slidably disposed in part in the fuel plunger bore thereby defining a plunger chamber, the fuel plunger chamber being open to the rate shaping opening with the plunger in a start of injection position and closed to the rate shaping opening with the plunger in an end of injection position;

a nozzle disposed in part in the casing proximate to the barrel opposite the body and having a tip extending from the casing and defining a fuel passage from the fuel plunger chamber to an injection orifice through an end of the tip;

a solenoid actuator fixed to the body and having a movable armature responsive to electrical signals;

a popper valve fixed to the movable armature for unitary movement therewith and slidably disposed in a poppet valve bore of the body and having an open position wherein pressurized fluid flow along the communication channel is freely communicated from the source of pressurized fluid to the piston pressure chamber and having a closed position wherein pressurized fluid flow along the communication channel is blocked from reaching the piston pressure chamber;

a needle check disposed in the nozzle and operably blocking the orifice in a first position;

a needle check spring disposed in the nozzle between the needle check and a reaction member biasing the check to a closed position;

a rate shaping valve disposed in the rate shaping bore of the barrel; and a rate shaping valve spring disposed between the casing and the rate shaping valve and biasing the rate shaping valve toward the rate shaping valve seat.

3. A fuel injector comprising:

a pump having a barrel defining a fuel pressurization bore on a first axis and defining a rate shaping bore between a fuel pressurization chamber and an outside of the barrel in turn defining a rate shaping opening at the fuel pressurization bore and defining a rate shaping valve seat within the rate shaping bore disposed between the opening and the outside of the barrel, a plunger slidably disposed in part in a fuel plunger bore and defining a fuel plunger chamber and operably extending within the bore to cover the rate shaping opening at an end of injection position, a rate shaping valve disposed in the rate shaping bore of the barrel, and a rate shaping valve spring biasing the rate shaping valve toward the rate shaping valve seat;

a nozzle in fluid communication with the fuel plunger chamber of the pump and defining a tip of the fuel injector and defining a fuel passage from the fuel plunger chamber to at least one injection orifice at an end portion of the tip;

a needle check disposed in the nozzle and operably blocking the orifice in a first position; and a needle check spring disposed in the nozzle between the needle check and a reaction member biasing the check to the first position.

* * * * *